(12) United States Patent
Parazza et al.

(10) Patent No.: US 11,230,398 B2
(45) Date of Patent: Jan. 25, 2022

(54) FEEDING METHOD AND APPARATUS

(71) Applicant: G.D S.p.A., Bologna (IT)

(72) Inventors: Davide Parazza, Bologna (IT); Luca Federici, Bologna (IT)

(73) Assignee: G.D S.p.A., Bologna (IT)

(*) Notice: Subject to any disclaimer, the term of this patent is extended or adjusted under 35 U.S.C. 154(b) by 236 days.

(21) Appl. No.: 16/278,928

(22) Filed: Feb. 19, 2019

(65) Prior Publication Data

US 2019/0256234 A1    Aug. 22, 2019

(30) Foreign Application Priority Data

Feb. 19, 2018    (IT) .................... IT102018000002797

(51) Int. Cl.
*B65B 35/16*    (2006.01)
*B65B 5/10*    (2006.01)
(Continued)

(52) U.S. Cl.
CPC ............. *B65B 35/16* (2013.01); *B25J 9/0084* (2013.01); *B25J 9/0093* (2013.01); *B25J 15/0253* (2013.01); *B65B 5/105* (2013.01); *B65B 19/02* (2013.01); *B65B 35/02* (2013.01); *B65B 35/36* (2013.01); *B65B 41/08* (2013.01); (Continued)

(58) Field of Classification Search
CPC ......... B65B 35/16; B65B 5/105; B65B 19/02; B65B 35/02; B65B 35/36; B65B 41/08; B65B 61/20; B65B 61/207; B65B 35/405; B65B 35/52; B65B 2220/16; B65B 5/10; B65B 35/40552; B25J 9/0084; B25J 9/0093; B25J 9/0253; B25J 15/0253;
(Continued)

(56) References Cited

U.S. PATENT DOCUMENTS 2,971,768 A * 2/1961 Ackley .................. B62B 3/108
   280/35
4,502,587 A * 3/1985 Clark ..................... B65G 60/00
   198/347.1
(Continued)

FOREIGN PATENT DOCUMENTS

DE    102004019614 A1    12/2004
EP         1219539 A1     7/2002
GB         2227231 A      7/1990

OTHER PUBLICATIONS

Italian International Search Report & Written Opinion Application No. IT 201800002797 Completed: Aug. 28, 2018 8 Pages.

*Primary Examiner* — Thanh K Truong
*Assistant Examiner* — Scott A Howell
(74) *Attorney, Agent, or Firm* — Whitmyer IP Group LLC

(57) ABSTRACT

A method and a feeding apparatus for feeding spacers for cigarette packs are disclosed, in which each spacer comprises a substantially rectangular flat body, the spacers being insertable in cartons for cigarette packs to space out packs with dimensions smaller than the standard dimensions; the spacers are stacked on a pallet that is positioned in a withdrawal station; the stacks of spacers are withdrawn from the withdrawal station and transferred to a respective hopper by passing each stack of spacers through an upper opening of the hopper, to then unload the spacers one by one through a lower opening of the hopper.

6 Claims, 14 Drawing Sheets

(51) Int. Cl.

| | |
|---|---|
| B65B 19/02 | (2006.01) |
| B65B 35/02 | (2006.01) |
| B65B 35/36 | (2006.01) |
| B65B 61/20 | (2006.01) |
| B65D 25/10 | (2006.01) |
| B25J 9/00 | (2006.01) |
| B25J 15/02 | (2006.01) |
| B65D 57/00 | (2006.01) |
| B65G 37/00 | (2006.01) |
| B65G 25/02 | (2006.01) |
| B65B 41/08 | (2006.01) |
| B65B 35/40 | (2006.01) |
| B65D 77/04 | (2006.01) |
| B65B 35/52 | (2006.01) |

(52) U.S. Cl.
CPC ............ *B65B 61/20* (2013.01); *B65B 61/207* (2013.01); *B65D 25/10* (2013.01); *B65D 57/00* (2013.01); *B65G 25/02* (2013.01); *B65G 37/005* (2013.01); *B65B 5/10* (2013.01); *B65B 35/405* (2013.01); *B65B 35/52* (2013.01); *B65B 2220/16* (2013.01); *B65D 77/042* (2013.01)

(58) Field of Classification Search
CPC ...... B65D 25/10; B65D 57/00; B65D 77/042; B65G 25/02; B65G 37/005; B65G 5/10
See application file for complete search history.

(56) References Cited

U.S. PATENT DOCUMENTS

| | | | |
|---|---|---|---|
| 4,773,531 A | 9/1988 | Tudor et al. | |
| 4,815,251 A * | 3/1989 | Goodman | B65B 5/061 53/156 |
| 4,854,815 A * | 8/1989 | Augst | B65H 5/006 414/788.4 |
| 4,938,656 A | 7/1990 | Gamberini et al. | |
| 4,993,915 A * | 2/1991 | Berger | B65G 59/026 294/87.1 |
| 5,074,745 A * | 12/1991 | Neri | B65H 1/30 414/796.9 |
| 5,092,730 A * | 3/1992 | Neri | B65B 41/00 211/121 |
| 5,214,901 A | 6/1993 | Milliner | |
| 5,275,527 A * | 1/1994 | Turra | B65B 43/185 414/792 |
| 5,312,222 A * | 5/1994 | Neri | B65G 61/00 414/788 |
| 5,564,893 A * | 10/1996 | Tacchi | B65G 47/902 414/796.9 |
| 6,290,452 B1 * | 9/2001 | Wachter | B65H 1/30 414/626 |
| 8,167,530 B2 * | 5/2012 | Langlot | B65G 61/00 414/801 |
| 2007/0130855 A1 * | 6/2007 | Wentworth | E04F 13/04 52/281 |
| 2016/0252826 A1 | 9/2016 | Volkov et al. | |
| 2019/0276187 A1 * | 9/2019 | Tamura | B65D 25/10 |

* cited by examiner

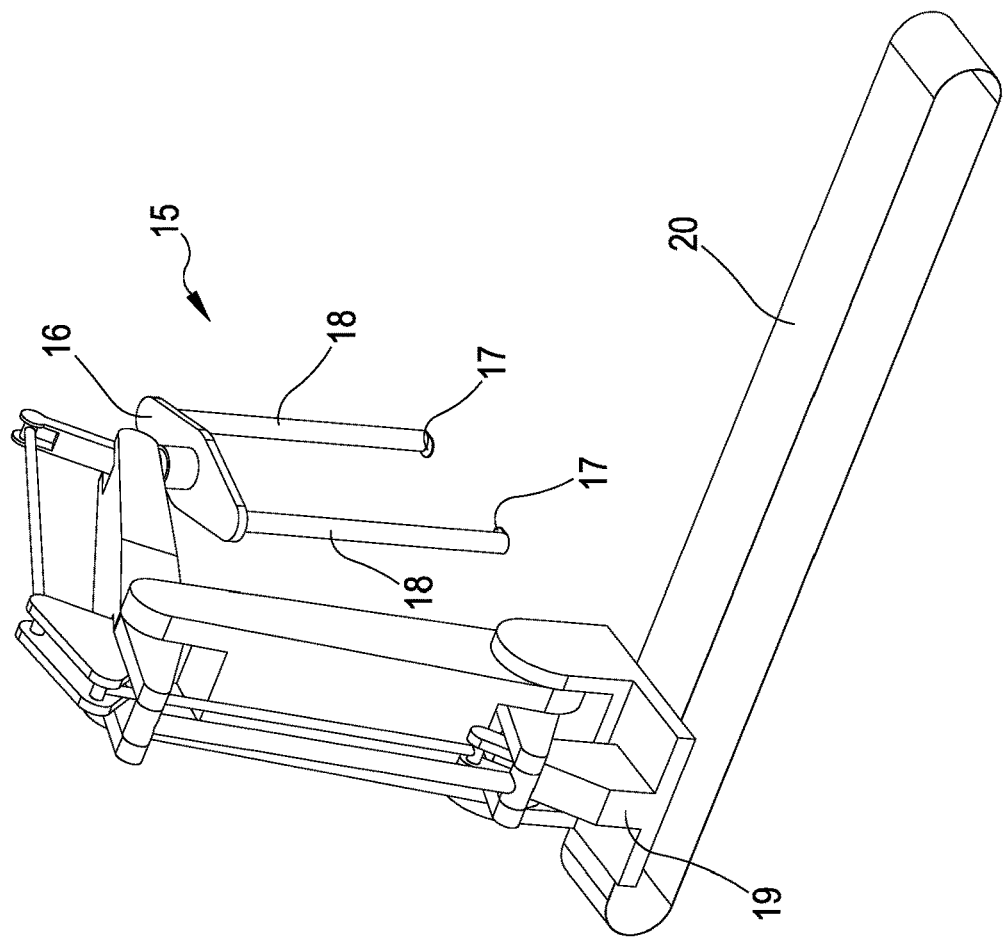
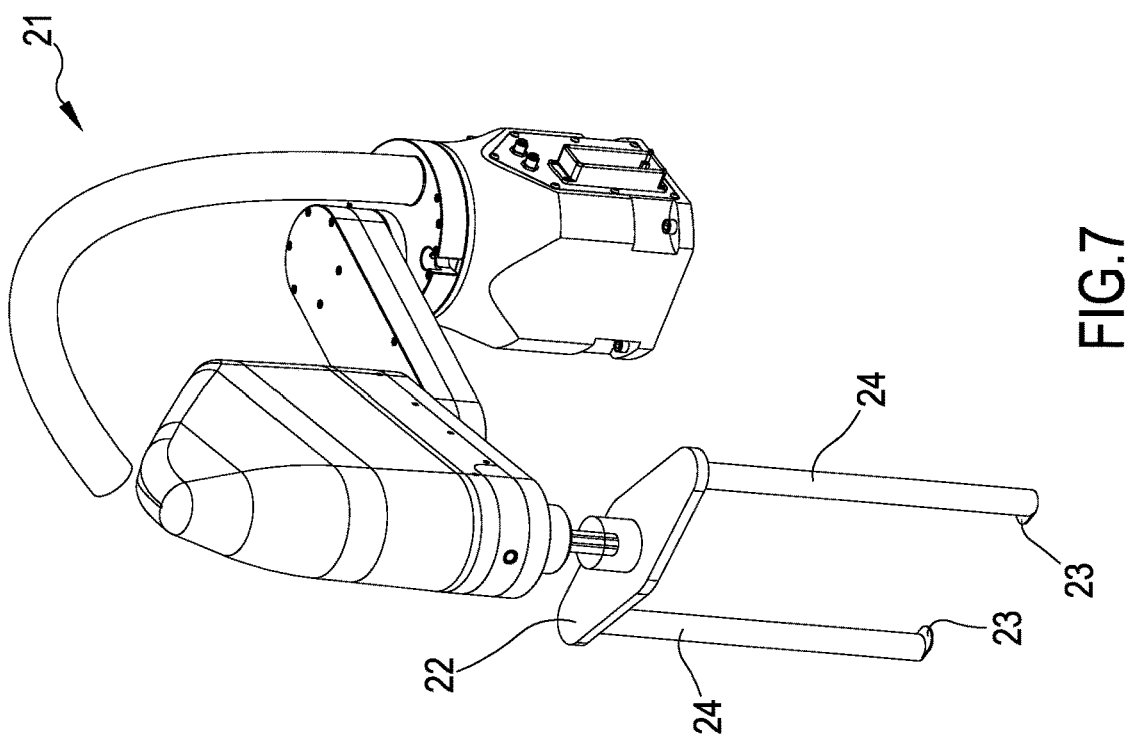
FIG.8
FIG.7

FEEDING METHOD AND APPARATUS

TECHNICAL FIELD

The present invention relates to a method and a feeding apparatus for feeding spacers for cigarette packs, in particular spacers to be inserted in cartons for standard dimensions containing cigarette packs with dimensions less than the standard dimensions.

The present invention further relates to a pallet for transporting spacers, a spacer for cigarette packs and a method for transporting spacers for cigarette packs on a transport pallet.

The present invention is intended, in particular, for use in machines for packaging cigarette packs.

PRIOR ART

Packaging of groups of cigarette packs is known, each of which comprises a certain number of packs of standard dimensions (in general ten packs for each group). Packaging groups of packs containing packs of dimensions less than the standard dimensions is also known.

In general, in order to facilitate packaging, the cartons that contain packs with dimensions less than the standard dimensions have the same dimensions as the cartons that contain packs with standard dimensions.

In order to enable cartons of the same dimensions to be made, also with packs that are smaller than standard packs, inserting into the cartons spacers that are configured to fill the empty spaces that are created when the cigarette packs have dimensions less than the standard dimensions is known.

U.S. Pat. No. 4,773,531 shows an embodiment of a carton of cigarette packs in which spacers are inserted to fill the empty spaces that are created when a carton of set dimensions contains packs of dimensions less than the standard dimension.

One of the problems of the prior art is to feed, rapidly and effectively, the spacers to be inserted into the groups of cigarette packs, as part of a packaging machine for packaging cigarette packs.

DESCRIPTION OF THE INVENTION

One object of the present invention is to provide a feeding method and/or a feeding apparatus that is able to solve the aforesaid problem.

One object of the present invention is to make a spacer to be inserted in a carton formed by a group of cigarette packs.

One advantage is to feed with high productivity the spacers to be inserted in a carton of cigarette packs.

One advantage is to provide a method and/or an apparatus for feeding spacers in a reliable, stable and safe manner.

One advantage is to make available a feeding apparatus of relatively reduced dimensions.

One advantage is to have a relatively reduced risk of damage to the spacers and/or imprecision in feeding.

One advantage is to ensure high feeding precision of the spacers.

One advantage is to give rise to an apparatus for feeding spacers that is easily insertable into a packaging line comprising a cartoning machine that forms cartons of groups of cigarette packs.

According to the present invention a method and/or an apparatus and/or a spacer is provided as in the appended claims.

BRIEF DESCRIPTION OF THE DRAWINGS

The present invention will now be disclosed with reference to the attached drawings that illustrate some embodiments thereof by way of non-limiting example, in which:

FIG. 7 is an enlarged perspective view of the first manipulator of spacers belonging to the apparatus of FIG. 1;

FIG. 8 is an enlarged perspective view of the second manipulator of spacers belonging to the apparatus of FIG. 1;

PREFERRED EMBODIMENTS OF THE INVENTION

Figure 1:
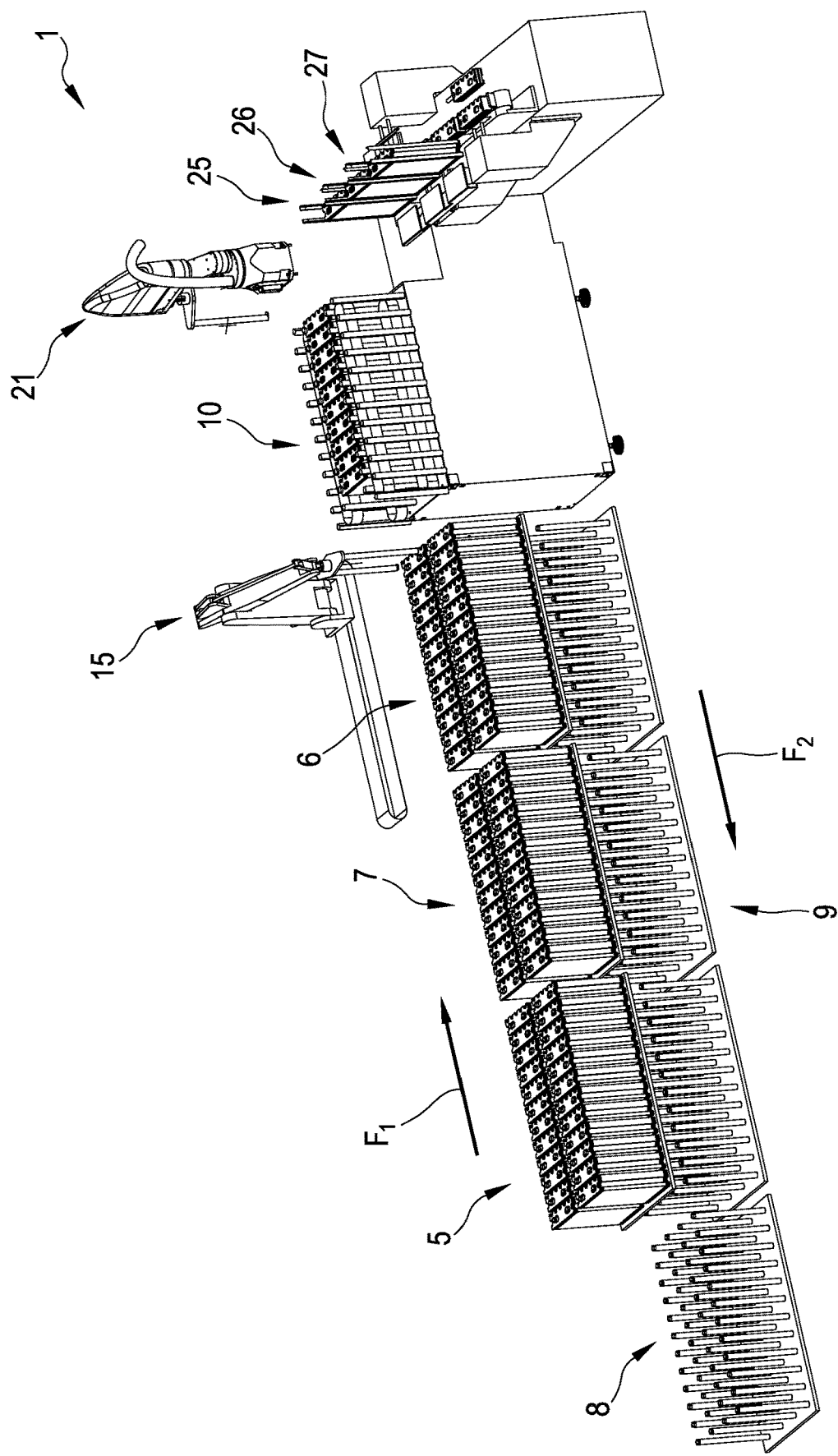
FIG. 1 is a perspective view of a first example of an apparatus according to the invention, from a first side of the apparatus.
Figure 2:
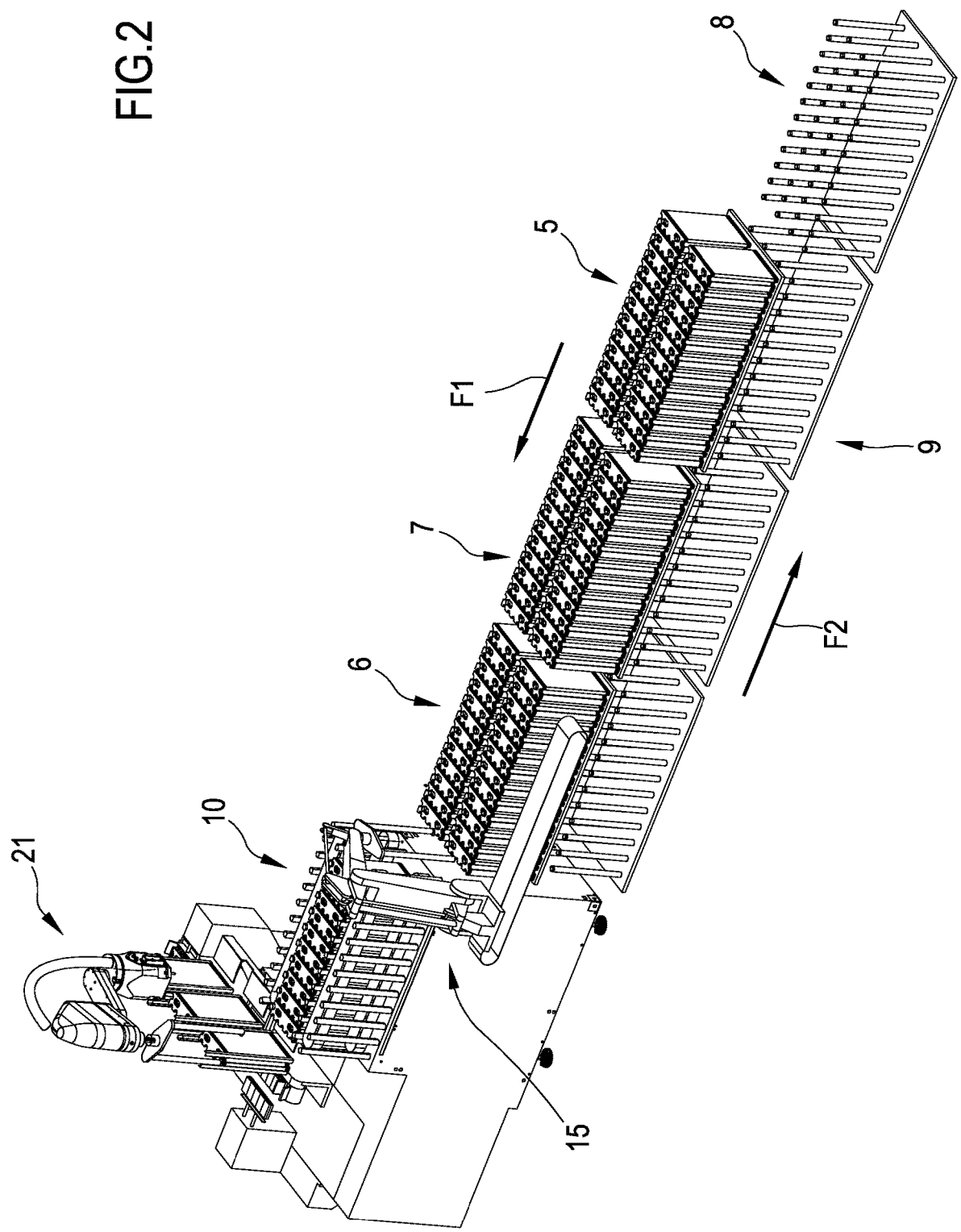
FIG. 2 is a perspective view of the apparatus of FIG. 1, from a second side of the apparatus opposite the first side.
Figure 3:
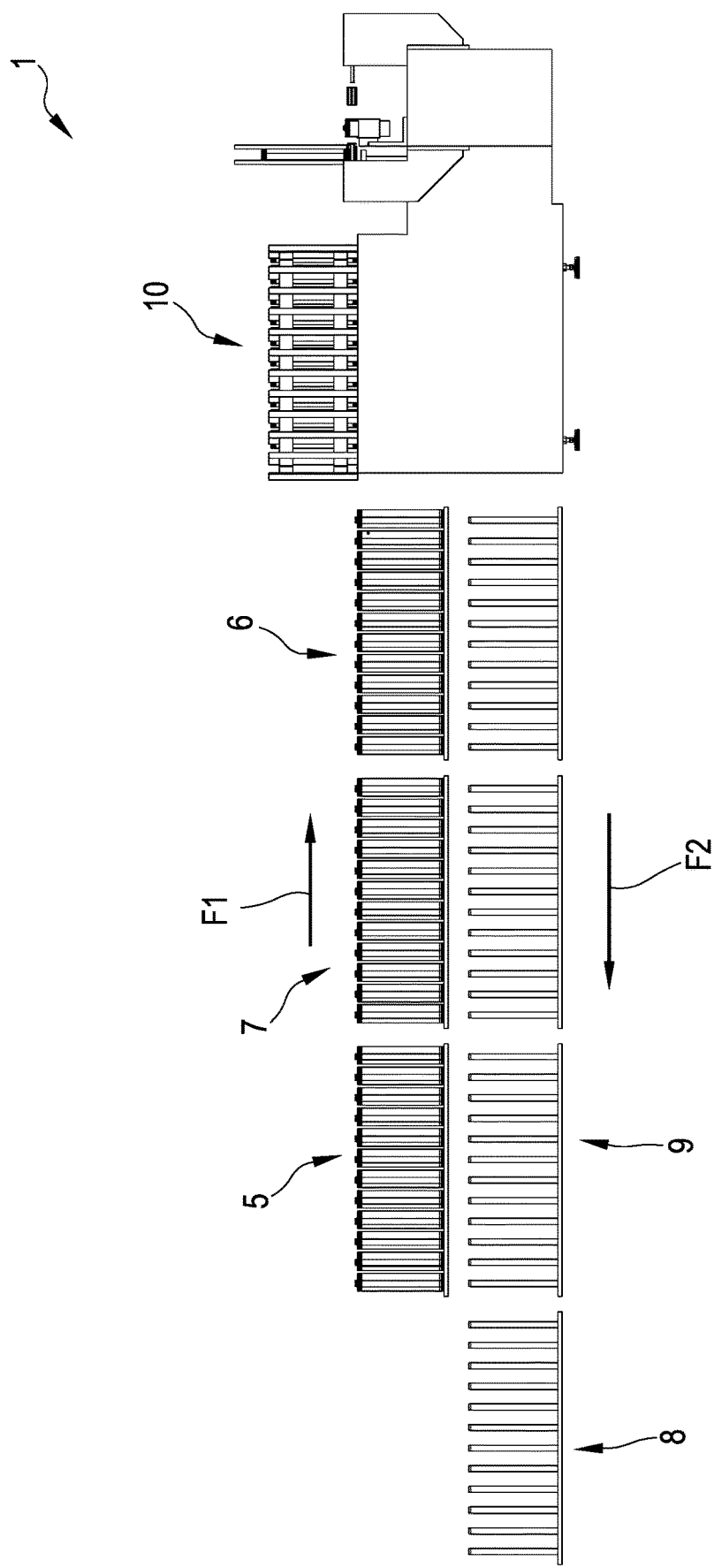
FIG. 3 is a side view, in a vertical elevation, of the apparatus of FIG. 1.
Figure 4:
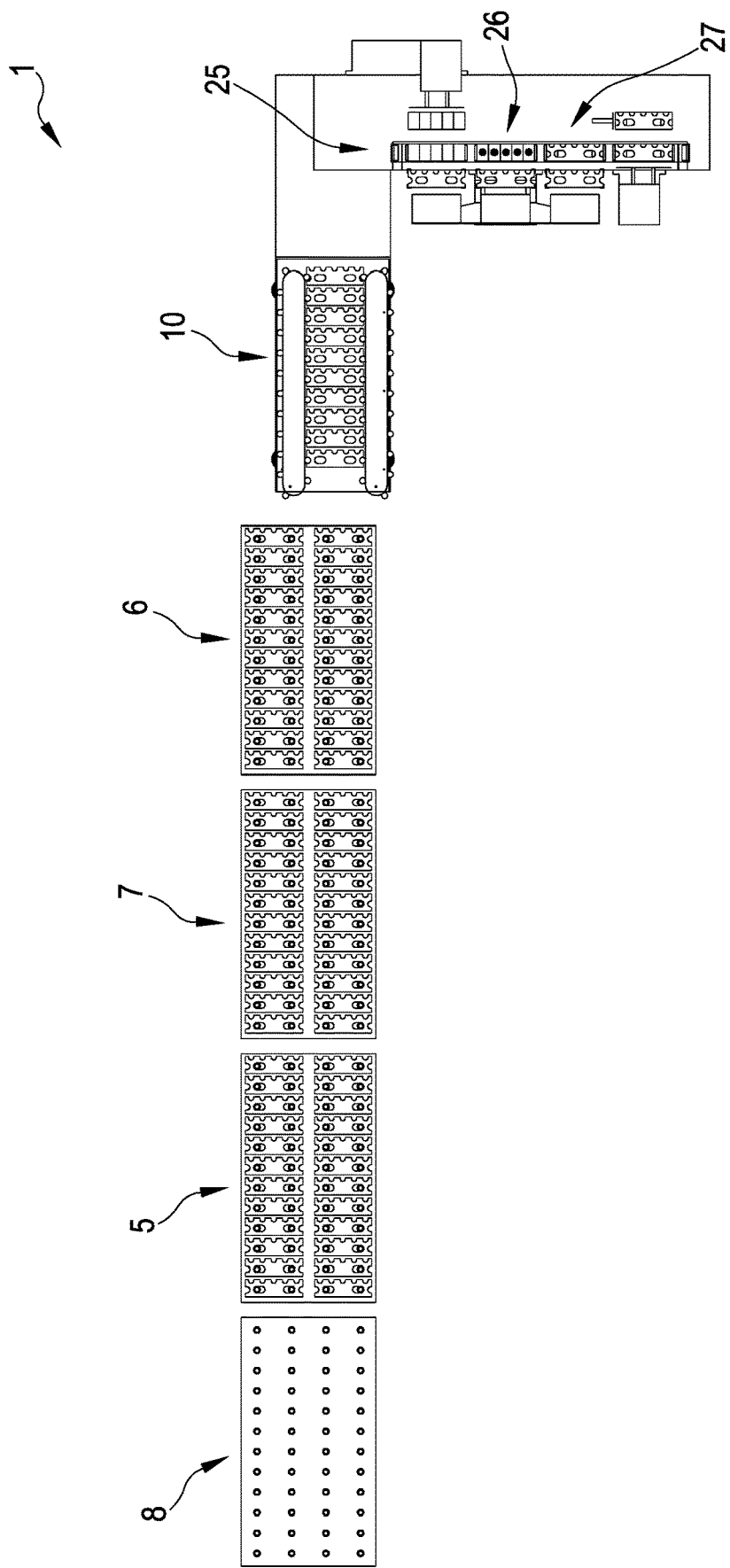
FIG. 4 is a top plan view of the apparatus of FIG. 1.
Figure 5:
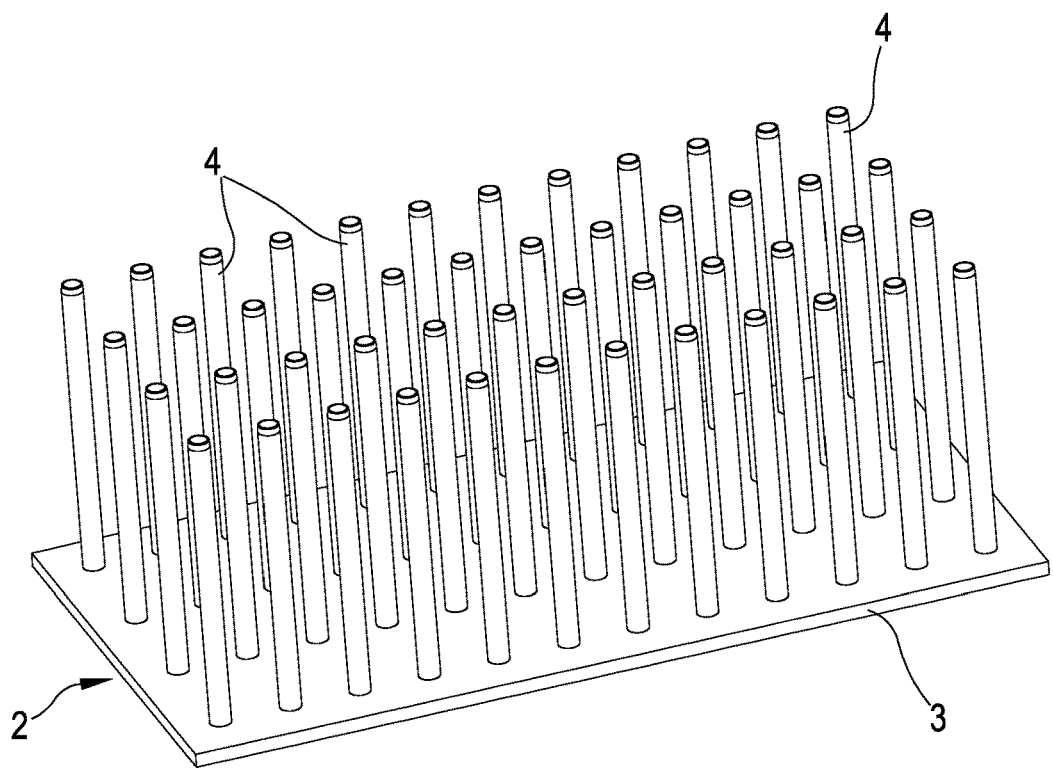
FIG. 5 is a perspective view of a pallet belonging to the apparatus of FIG. 1.
Figure 6:
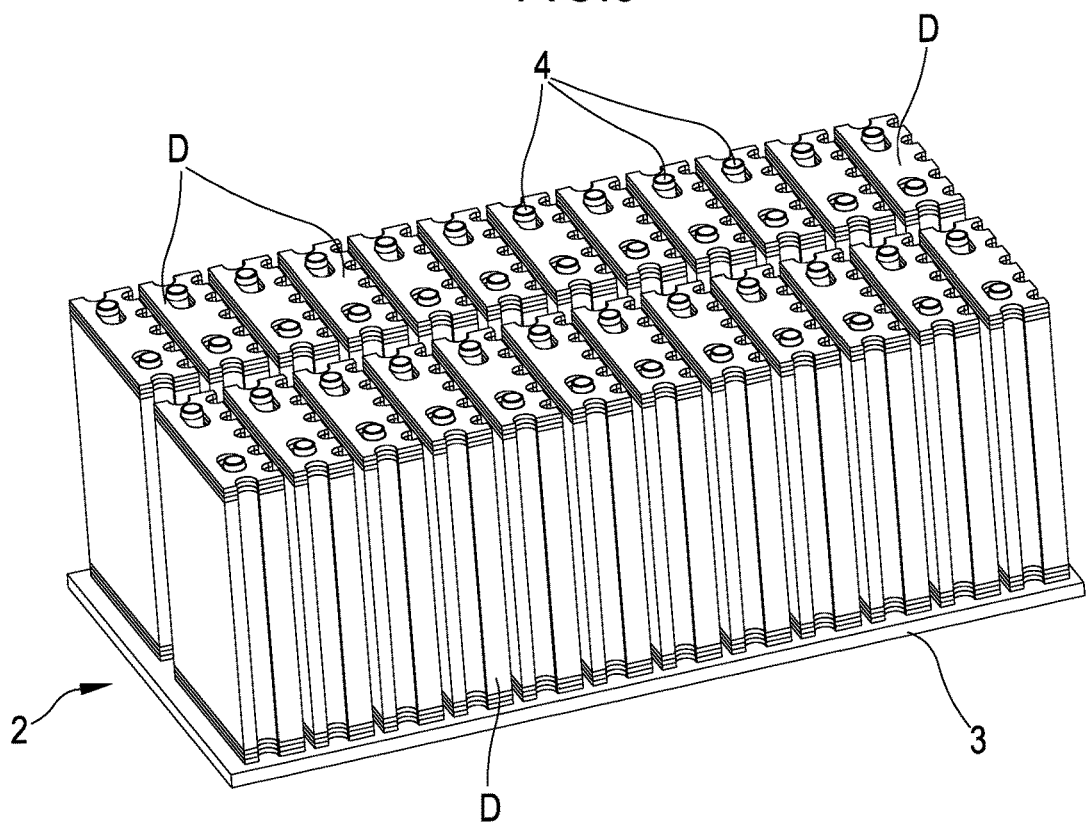
FIG. 6 is the view of the pallet of FIG. 5 loaded with spacers.

In this description, identical elements that are common to the illustrated embodiments are indicated by the same numbering.

With 1, an apparatus has been indicated overall for feeding spacers D for packs P of cigarettes. Each spacer D is configured to act as a thickness inserted inside a carton containing a plurality of packs P of cigarettes, in order to space out the cigarette packs when the latter have dimensions less than the standard dimensions and are contained in cartons that have the same dimensions as cartons formed by cigarette packs of standard dimensions.

The apparatus 1 for feeding spacers D disclosed here is intended to be included in a cigarette packaging line, when the cigarette packs have dimensions less than the standard dimensions (for example packs containing cigarettes in "slim" format or packs containing a number of cigarettes less than the standard number).

The apparatus 1 for feeding spacers can be inserted in a cigarette packaging line (for example of known type) that may comprise, in particular, a packaging machine that forms the cigarette packs and a cellophane wrapping machine that wraps the cigarette packs. The cellophane wrapped packs are generally divided into groups (for example of ten packs) and sent to a cartoning machine that forms the finished cartons, which can be sent to a cartoning machine.

The apparatus 1 for feeding spacers is intended to be arranged, in particular, along a cigarette packaging line so as to receive the groups formed by a certain number of cellophane-wrapped packs P (in general ten packs P), in order to then surrender the groups of packs to the cartoning machine, after inserting into the groups of packs P the spacers D that are necessary for the dimension of each group of packs to become equal to the dimension of a group of packs of standard dimensions.

Each spacer D, or thickness, or insert, enables the empty spaces to be filled that are created when the carton (group of ten packs P) contains packs P of cigarettes that have dimensions less than the standard dimensions, whereas the carton must have the dimensions of a standard carton, i.e. a carton suitable for containing cigarette packs of standard dimensions.

Each spacer D comprises a body, of substantially rectangular flat shape, in which one or more through holes H are obtained that are intended to have one or more pegs of a pallet 2 inserted in them for transporting spacers, arranged in stacks on one another, as will be explained better below.

The spacers D may be made, for example, of cardboard (in particular corrugated cardboard) and/or of plastics and/or or yet another material.

Each spacer D has at least two recesses R arranged on two opposite sides, in particular on the two short sides of the spacer D of rectangular shape, for example recesses of semicircular shape.

The feeding apparatus 1 comprises at least one pallet 2 configured to load one or more stacks of spacers D. The pallet 2 comprises a base 3, of flat shape, from which one or more vertical elements emerge, which are orthogonal to the base 3, arranged for receiving the through holes H obtained in the spacers D. In this specific case, the vertical elements comprise pegs 4.

The through holes H of the spacers D of each stack are aligned together so that each vertical element (peg 4) can be inserted inside the aligned through holes H of the spacers D of the stack.

The pallet 2 may comprise, as in this embodiment, a plurality of pairs of pegs 4 in which each pair of pegs 4 is configured to be inserted into a corresponding pair of through holes H obtained in each spacer D. In this specific embodiment, each pallet 2 is configured to receive twenty-four stacks of spacers D, in which each stack consists of sixty spacers D.

Inserting each spacer D in at least two vertical elements (pegs 4) improves the stability of the stacks of spacers D during transport and avoids rotations, even minor rotations, of the spacers D. It is possible to provide an embodiment, which is not illustrated, in which each vertical element has a flat shape (for example lamina or plate-shaped vertical elements). In this case, accordingly, each vertical element, in addition to the vertical height extent, has a certain extent in width, with a relatively thin lining. Each vertical element of flat shape is configured to be inserted into a corresponding through hole of oblong shape, for example of oval shape or in the form of an elongated slit, obtained in each spacer. Coupling a vertical element of flat shape in an oblong hole of a respective spacer ensures, also in this case, the stability of the stacks of spacers during transport and avoids rotations of the spacers.

The feeding apparatus 1 comprises at least one loading station 5 in which it is possible to position a pallet 2 loaded with one or more stacks of spacers D. The spacers D can be stacked (for example manually) on a pallet 2 in a stacking zone, which is not illustrated, which may be far from the feeding apparatus 1. Each pallet 2, once the spacers D have been stacked, is loaded, for example manually or by a forklift truck, into the loading station 5.

The feeding apparatus 1 comprises at least one withdrawal station 6 in which it is possible to position a pallet 2 loaded with one or more stacks of spacers D. In the withdrawal station 6, the stacks of spacers D are unloaded from each pallet 2, as will be explained better below in the description.

The feeding apparatus 1 may comprise, as in these embodiments, at least one intermediate station 7 in which it is possible to position a pallet 2 between the loading station 5 and the withdrawal station 6.

The feeding apparatus 1 comprises a pallet moving device configured to move, in particular with intermittent motion, each pallet 2, loaded with one or more stacks of spacers D, from the loading station 5 to the withdrawal station 6, along a feeding direction F1 (for example horizontal), in particular passing, as in these embodiments, through the intermediate station 7.

In particular, the loading station 5, the withdrawal station 6 and the intermediate station 7 are coplanar with one another (on a horizontal plane). The pallets 2 advance in line one after the other with intermittent motion so as to wait for a set period of time in each station 5, 6, 7. The dwell time will depend on the time necessary for emptying the pallet 2 that is located in the withdrawal station 6.

The pallet moving device (not illustrated) may comprise a movement device of chain and/or roller and/or belt and/or strap and/or of yet another type.

The feeding apparatus 1 comprises at least one empty pallet 8 recovery zone that may be arranged, in particular, at a lower level than the loading station 5.

The feeding apparatus 1 may comprise, as in these embodiments, a return path 9 of the empty pallets arranged at the same level as the empty pallet 8 recovery zone. The return path 9 of the empty pallets may comprise, in particular, a first lower zone arranged below the vertical of the withdrawal station 6, a second lower zone arranged below the vertical of the intermediate station 7, a third lower zone arranged below the vertical of the loading station 5. The return path 9 of the empty pallets may be rectilinear, as in these embodiments, so that the first lower zone, the second lower zone, the third lower zone and the empty pallet 8 recovery zone are arranged aligned on one another.

The pallet moving device may comprise a movable plane (which is not illustrated) with ascent and descent movement between the withdrawal station 6 and the first lower zone of the return path 9. The movable plane (for example a movable ascent and descent transport plane) is configured to take on board the pallet 2 and take the pallet to the desired height, i.e. in the specific case, to take the pallet on board in the withdrawal station 6 to then make the pallet descend to the first lower zone below of the return path 9, and subsequently reascend empty to then take the subsequent pallet 2 on board.

The pallet moving device is configured to move, in particular with intermittent motion, the empty pallets 2 (devoid of spacers D) from the withdrawal station 6 to the empty pallet 8 recovery zone, initially with a vertical descent movement, from the withdrawal station 6 to the first lower zone, and subsequently with a horizontal movement along the return path 9.

Figure 17:
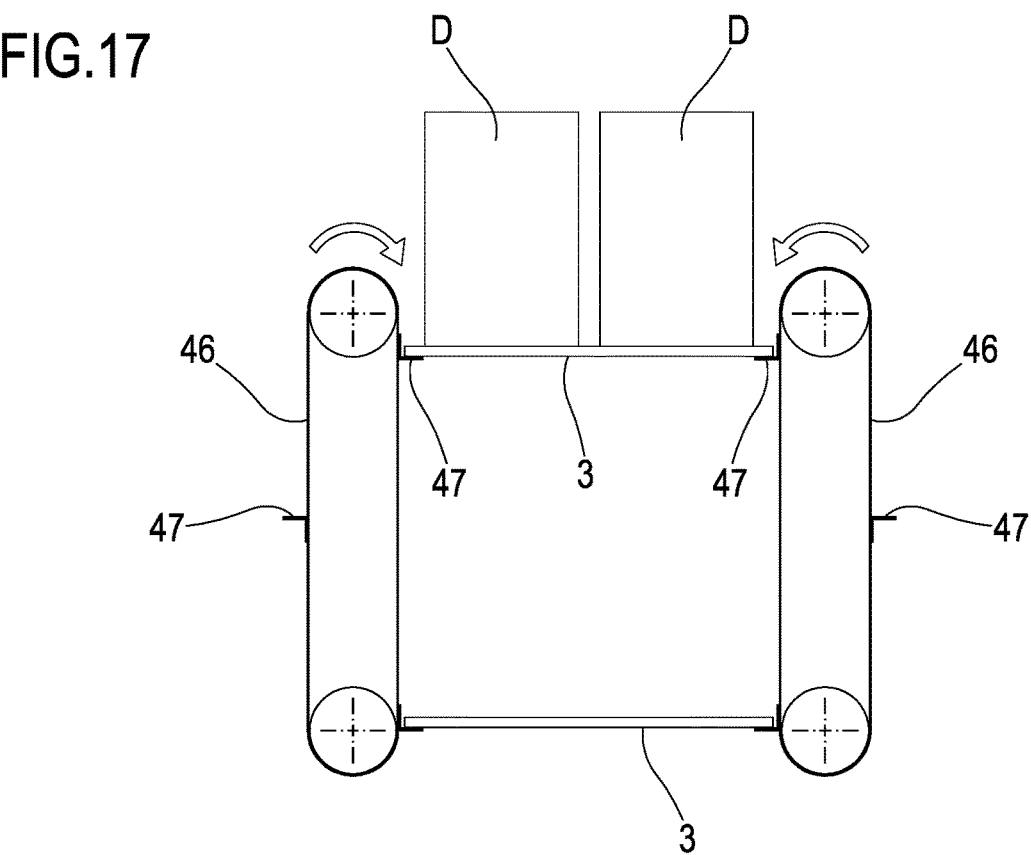
FIG. 17 is a vertical elevation of a schematic view of a transport system for lowering the empty pallet from the withdrawal station of the apparatus of FIG. 1 to the station below.

The pallet moving device may comprise, alternatively to the aforesaid movable ascent and descent plane, a descent system like that shown schematically in FIG. 17, for the descent of the empty pallet from the withdrawal station 6 to the first lower zone (below the withdrawal station 6). This descent system may comprise, in particular, two transport elements 46 arranged alongside one another on two opposite sides of the withdrawal station 6. Each transport element 46 extends (in a vertical direction) between the withdrawal station 6 and the first lower zone. Each transport element 46 may comprise, as in this embodiment, a closed loop flexible element, which is slidable upon a motor-driven command.

Each transport element 46 may carry two or more support elements 47 (three support elements 47, in the specific example) distributed along the transport element 46 and spaced out from one another (for example equidistant from one another). Each support element 47 of a transport element 46 collaborates with a corresponding support element 47 of the other transport element 46 to restingly support a pallet 2 (along the two sides of the pallet).

Each support element 47 is configured so as to perform at least one vertical descent movement from an upper position, in which it collaborates with another support element 47 to support a pallet 2 in the withdrawal station 6, to a lower position, in which collaborates with the other support element 47 to support a pallet 2 in the first lower zone. Each support element 47 is configured so as to perform a closed loop movement to return to the upper position and perform a new descent movement of another pallet 2.

The pallet moving device comprises a pallet return device (not illustrated) that moves the pallets (with horizontal movements) along the return path 9, from the first lower zone to the empty pallet 8 recovery zone, passing by the second lower zone and then by the third lower zone, in a feeding direction F2 opposite the feeding direction F1.

The pallet return device may comprise a movement device of chain and/or roller and/or belt and/or strap and/or of yet another type.

The feeding apparatus 1 comprises a temporary storage zone 10 of the stacks of spacers D. The temporary storage zone 10 is arranged downstream of the withdrawal station 6, where "downstream" means downstream of a direction of the feeding flow of the spacers D.

In the temporary storage zone 10 the stacks of spacers D are arranged in a row behind one another. In the temporary storage zone 10 the stacks of spacers D advance with a horizontal linear motion from an inlet 11 to an outlet 12.

Figure 9:
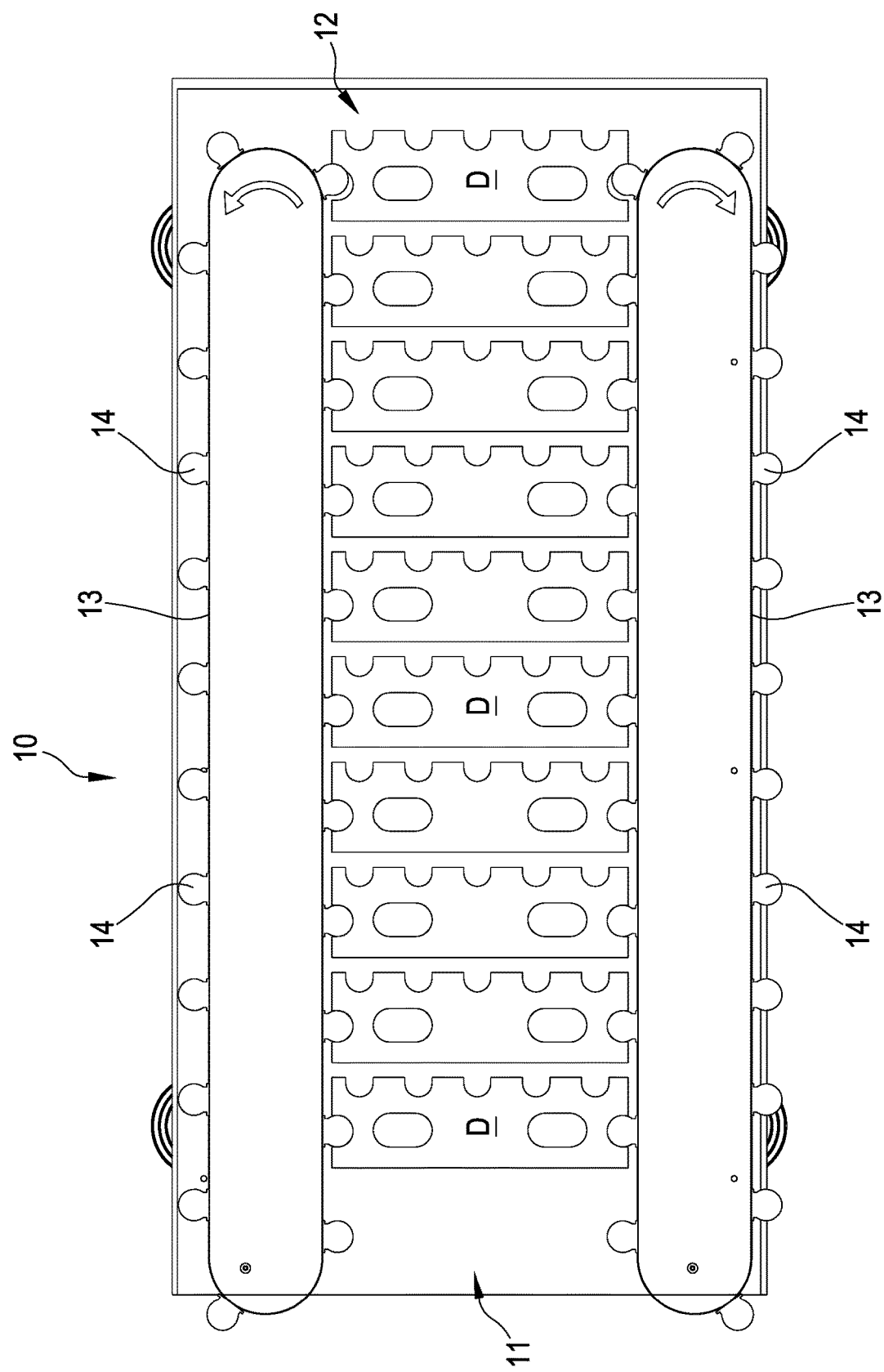
FIG. 9 shows an enlarged part of FIG. 4 that includes the temporary storage zone of the spacers.
Figure 10:
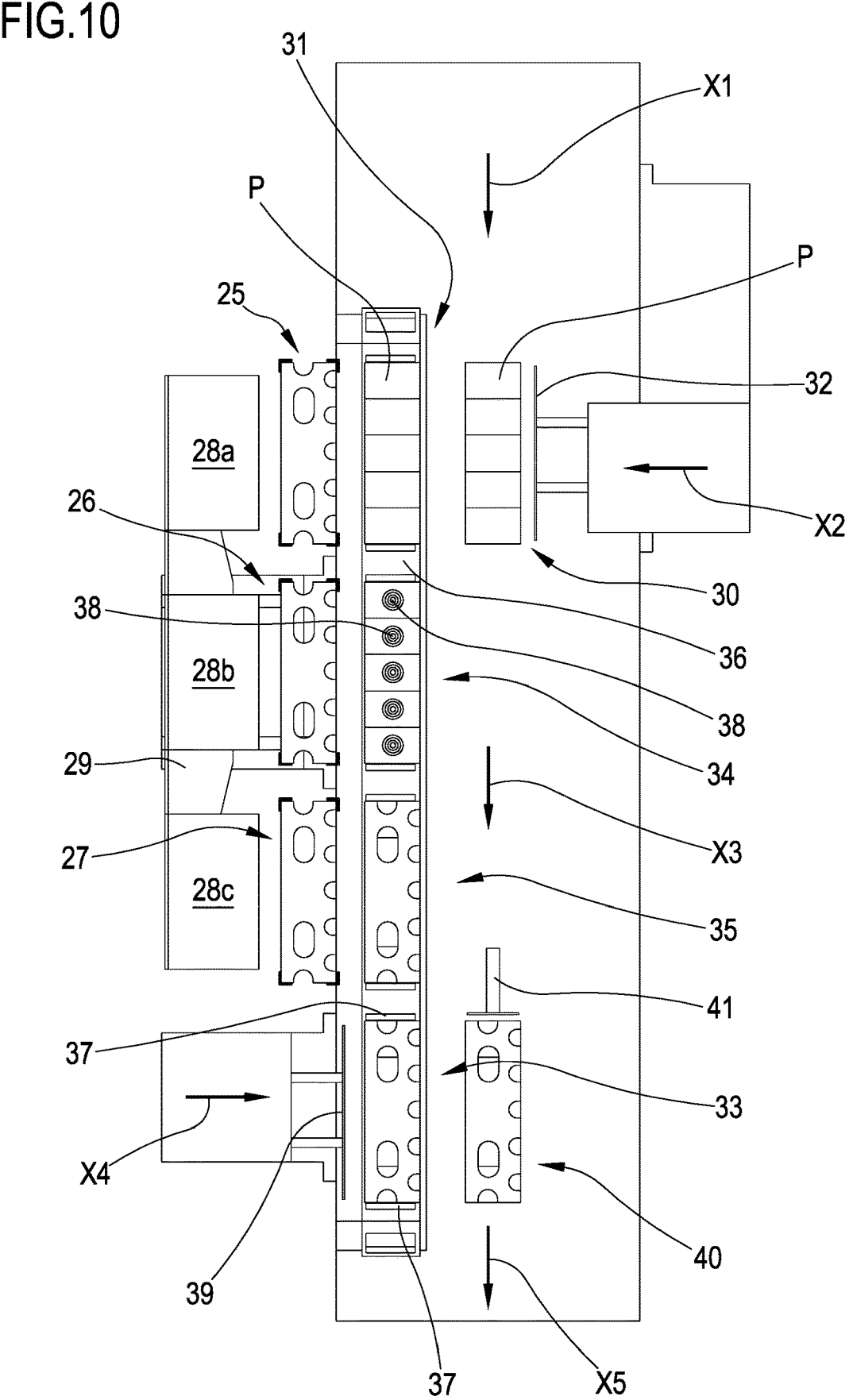
FIG. 10 shows an enlarged part of FIG. 4 that includes the inserting device for inserting the spacers in the cartons.
Figure 11:
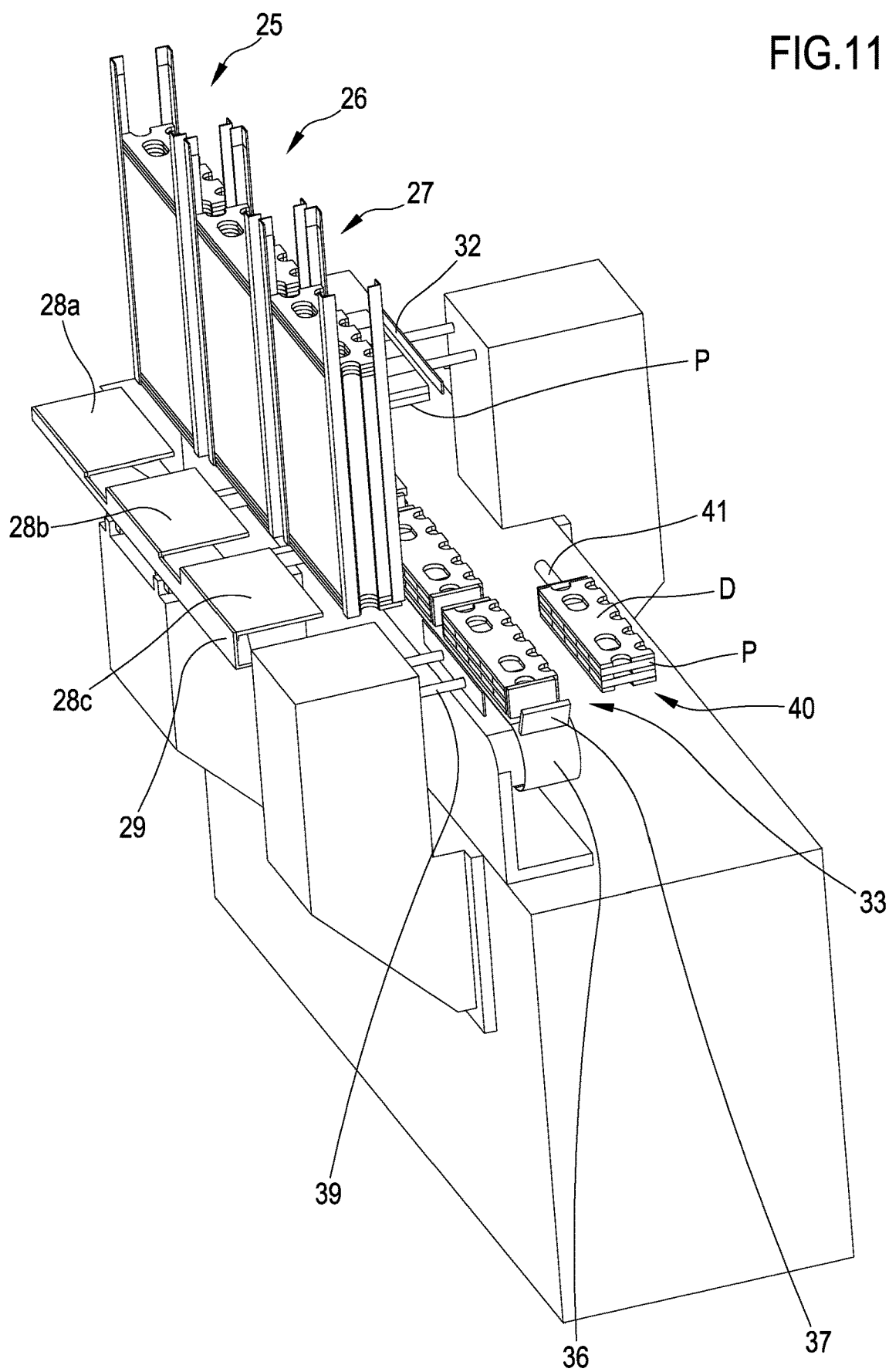
FIG. 11 is a perspective view of the inserting device for inserting the spacers shown in FIG. 10.

The feeding apparatus 1 comprises a motor-driven conveyor configured to transport the stacks of spacers D from the inlet 11 to the outlet 12 of the temporary storage zone 10. In the specific example illustrated in greater detail in FIG. 9, the conveyor comprises two movable conveyor elements 13, cooperating with one another, next to and parallel to one another, arranged on two opposite sides of the row of stacks of spacers D. The two conveyor elements 13 are arranged for interacting in contact laterally with the stacks of spacers D and dragging the stacks of spacers D forwards, in a row one after the other, from the inlet 11 to the outlet 12 of the temporary storage zone 10.

Each conveyor element 13 comprises at least one flexible sliding member (for example a belt, a strap or a chain) wound in a closed loop. In the specific case, each conveyor element 13 comprises two flexible sliding members arranged spaced out from one another one above the other.

Each conveyor element 13 carries a plurality of vertical rods 14 distributed along the closed loop conveyor element 13 and spaced equally apart from one another. The vertical rods 14, which are carried in movement by the respective conveyor element 13, are arranged for being inserted into the recesses R arranged on the two opposite sides of the spacers D that make up the stacks, to facilitate gripping and dragging forward of the stacks of spacers D by the conveyor elements 13.

The feeding apparatus 1 comprises at least one first manipulator 15 configured to remove a stack of spacers D from the withdrawal station 6 and to position the stack of spacers D in the temporary storage zone 10. The first manipulator 15 operates by removing one stack of spacers at a time.

The first manipulator 15 comprises a movable transport head 16, provided with two supporting feet 17 that are positionable below two opposite sides of at least one stack of spacers D to lift the stack. The transport head 16 of the first manipulator 15 is configured to transport the stack of spacers resting on the supporting feet 17.

The movable transport head 16 comprises two vertical rods 18 provided with the possibility of performing reciprocal approaching and moving away movements, with a motor-driven command, to remove and, respectively, release the stack of spacers D.

The two supporting feet 17 are carried by the two rods 18. In particular, the two rods 18 end below with the two supporting feet 17.

The first manipulator 15 may comprise, as in the illustrated embodiment, a depalletizing robot with a first articulated arm that at one end has the transport head 16 and at the opposite end is articulated on a second articulated arm carried by a support 19 that is able to perform linear movements, upon a motor-driven command, in both directions (backwards and forwards), next to the withdrawal station 6, parallel to the pallet feeding direction F1.

The support 19 of the depalletizing robot is mounted on motor-driven movement device comprising, in particular, a conveying member 20, for example a flexible member wound in a closed loop.

The depalletizing robot is configured and arranged in such a manner as to be able to remove selectively any stack of spacers D loaded on a pallet 2 arranged in the withdrawal station 6.

The first manipulator may comprise, in other embodiments that are not illustrated, other types of manipulator, in particular a Cartesian depalletizer.

The feeding apparatus 1 comprises at least one second manipulator 21 configured to remove a stack of spacers D from the temporary storage zone 10. The second manipulator 21 operates by removing one stack of spacers D at a time.

The second manipulator 21 comprises a transport head 22 that is movable in turn, comprising, as in the first manipulator 15, two supporting feet 23 that are positionable below two opposite sides of at least one stack of spacers D. Also the second manipulator 21 is configured to transport a stack of spacers D resting on the two supporting feet 23 arranged at the lower ends of two vertical rods 24 provided with the possibility of performing reciprocal approaching and moving away movements upon a motor-driven command.

The second manipulator 21 may comprise, as in the illustrated embodiment, a SCARA (Selective Compliance Assembly Robot Arm) configured and arranged for removing a stack of spacers D from the outlet 12 of the temporary storage zone 10 and for releasing the stack into a hopper of the feeding apparatus.

The second manipulator may comprise, in other embodiments that are not illustrated, other types of manipulator, in particular a Cartesian depalletizer.

The feeding apparatus 1 comprises an inserting device for inserting the spacers D into the cartons for cigarette packs. This inserting device comprises one or more hoppers 25, 26, 27, each of which is configured to contain the spacers D stacked on one another. The stacks of spacers D are transferred from the temporary storage zone 10 to the various hoppers 25, 26, 27. In particular the feeding apparatus 1 comprises three hoppers 25, 26, 27 arranged aligned alongside one another.

Each hopper 25, 26, 27 may comprise, as in this specific embodiment, four angular uprights arranged in a rectangle to contain the spacers D, which are substantially rectangular, which are stacked on one another.

Each hopper 25, 26, 27 comprises an upper inlet opening for a stack of spacers D and a lower outlet opening for a single spacer D.

The first manipulator 15, the conveyor operating in the temporary storage zone 10 and the second manipulator 21 contribute to forming a transferring device for transferring each stack of spacers D from the withdrawal station 6 to a respective hopper 25, 26 or 27, in a selective manner according to need (so that no hopper remains devoid of spacers), by passing each stack of spacers D through the upper opening of the respective hopper 25, 26, 27.

The feeding apparatus 1 comprises a device for unloading the spacers one by one from each hopper 25, 26, 27 through the lower opening of the hopper.

The device for unloading the spacers singly comprises, for each hopper 25, 26, 27, a pusher 28a, 28b, 28c, movable with reciprocating motion, provided with the possibility of performing an active forward movement, in which it pushes the last spacer D forwards, stacked lower down on the bottom of the hopper 26, 26, 27, and a backward return movement, in which it returns to the initial position ready to push forward the next spacer D that in the meantime has moved further down towards the bottom of the hopper 25, 26, 27.

The device for unloading the spacers may comprise, as in this embodiment, a movable support 29 that is controlled by a linear actuator or by a kinematic mechanism (for example of the connecting rod-crank type or other kinematic mechanism suitable for transforming a rotation motion into a reciprocal motion) connected to a rotor, which supports all three pushers 28a, 28b, 28c of the three hoppers 25, 26, 27, which pushers accordingly move backwards and forwards simultaneously. Each pusher 28a, 28b, 28c may comprise, in particular, a rectangular plate-shaped body (arranged horizontally).

The inserting device operates in such a manner as to insert the spacers D into the cartons formed by the groups of (ten) packs P of cigarettes.

The inserting device comprises three inserting stations in each of which the spacers D are inserted one at a time inside the groups of packs P, in such a manner that three spacers D are inserted into each group of packs P.

Figure 12:
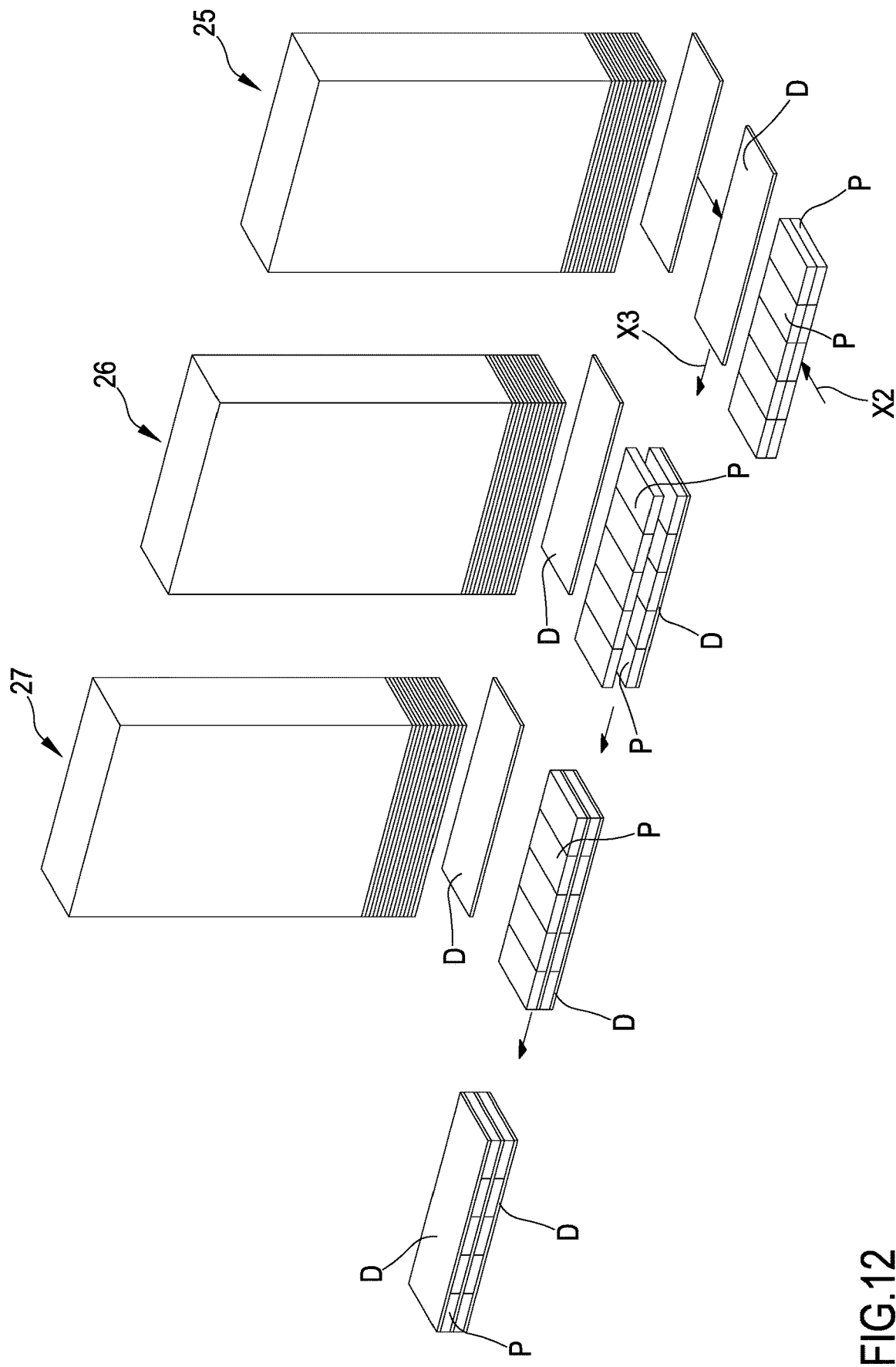
FIG. 12 shows an operating diagram of the inserting device for inserting the spacers shown in FIG. 10.

FIG. 12 shows schematically the inserting device during operation thereof, where a spacer D is inserted in the first inserting station (on the left in FIG. 12) and then a group of packs P is introduced above the inserted spacer, a spacer D is inserted in the second inserting station (in the centre in FIG. 12) between the two layers of packs P that make up the group of packs P (as will be explained better below in the description), in the third inserting station (to the right in FIG. 12) a spacer D is inserted above the group of packs P.

Each inserting station is arranged next to a respective hopper 25, 26, 27 containing the stacks of spacers D. Insertion is made by the aforesaid device for unloading the spacers from the hoppers that push the spacer D outside the hopper 25, 26, 27 and transport the hopper to the inserting station to the position that is suitable for inserting into the group of packs P.

A feeding unit is provided (which is not illustrated, which is for example of known type) configured to feed the packs P of cigarettes divided into groups ordered, for example in groups formed of ten packs P each. The groups of packs P are fed, for example in a known manner, to a packs inlet station 30 arranged opposite a first spacer inserting station 31. The groups of (ten) packs P of cigarettes are fed one at a time to the packs inlet station 30.

The groups of packs P arrive at the packs inlet station 30, moving in a pack entry direction X1, already organized in a preset manner, for example in the same arrangement that they will have in the finished carton, in this case in two superimposed rows of five packs P for each row.

The first spacer inserting station 31 is arranged between the first hopper 25 and the packs inlet station 30. The packaging machine comprises a thrust device 32 configured to push the group of packs P of cigarettes from the packs inlet station 30 to the first inserting station 31, with a thrust direction X2 transverse to the pack entry direction X1.

The feeding apparatus 1 comprises a (programmable electronic) controller configured so that, in the first spacer inserting station 31, a spacer D is positioned that comes from the first hopper 25 and, above the spacer D, a group of packs P of cigarettes is thus positioned that come from the packs inlet station 30.

The inserting device comprises a conveyor configured to convey the groups of packs P, with intermittent motion, from the first spacer inserting station 31 to an ejecting station 33, passing through a second spacer inserting station 34 and a third spacer inserting station 35, in a transport direction X3 that is transverse to the thrust direction X2 that goes from the packs inlet station 30 to the first spacer inserting station 31. The transport direction X3 of the conveyor may be, in particular, parallel to the pack entry direction X1.

The conveyor may comprise, as in this embodiment, a flexible conveying member 36 wound in a closed loop comprising a plurality of containers, distributed along the conveying member 36 and equidistant from one another, each of which is configured to contain a group of packs P. Each container comprises a pair of containing walls 37 spaced out from one another and between which a single group of packs P of cigarettes and also the (three) spacers D are inserted.

The inserting device comprises a lifting device arranged in the second spacer inserting station 34 to lift the (five) packs P of cigarettes arranged above the group of packs, to enable a spacer D to be inserted between two layers of packs P that form the group of packs P.

The lifting device is configured to lift simultaneously the packs P of cigarettes that form the upper layer of the group of packs P in the second spacer inserting station 34. The lifting device may comprise, as in this embodiment, a gripping device of suction cup type, for example a group of suction cups 38 comprising a suction cup for each pack P to be lifted (five suction cups). The gripping device of suction cup type is mounted on a movable lifting head (which is not illustrated).

The second pusher 28b, which pushes the lower spacer D of the second hopper 26 and inserts the lower spacer D in the second spacer inserting station 34 (above the lower layer of cigarette packs), will be arranged at a level slightly higher than the first pusher 28a which pushes the lower spacer D of the first hopper 25 and inserts the lower spacer D in the first spacer inserting station 31.

The controller is configured in such a manner that, in the second spacer inserting station 34, the upper layer of packs P is first lifted, after which a spacer D coming from the second hopper 26 is inserted, positioning the spacer D above the lower layer of packs P. The lifting device lastly returns the upper layer of packs downwards, below the spacer D that has just been inserted in the carton.

The inserting device is configured to insert a spacer D coming from the third hopper 27 in the third spacer inserting station 35.

The inserting device comprises the third pusher 28c, which pushes the lower spacer D of the third hopper 27 and inserts the lower spacer D in the third spacer inserting station 35 (above the upper layer of cigarette packs). The third pusher 28c will be arranged at a level that is slightly higher than the second pusher 28b which pushes the lower spacer D of the second hopper 26.

It is possible to arrange a station after the third spacer inserting station 35. This subsequent station may comprise, as in this embodiment, the ejecting station 33 in which the carton (the group of ten packs P of cigarettes with the three spacers D inserted between the packs) is ejected from the conveyor (conveying member 36 with containing walls 37), for example by a pusher member 39 that pushes the carton in an ejection direction X4 that is transverse to the transport direction X3 of the conveyor.

In particular, the carton is pushed by the ejecting station 33 to a carton outlet station 40 in which another pusher member 41 operates that pushes the carton in an exit direction X5 transverse to the ejection direction X4. The exit direction X5 of the cartons may be parallel or, as in this embodiment, aligned with the entry direction X4 of the groups of packs P.

The operation of the feeding apparatus 1 disclosed above implements a method for feeding spacers D for packs P of cigarettes that comprises the following steps: loading one or more stacks of spacers D on at least one pallet 2, positioning the pallet 2 in the withdrawal station 6, transferring the stacks of spacers D from the withdrawal station 6 to a respective hopper 25, 26, 27, unloading the spacers D through a lower opening of the hopper 25, 26, 27.

The method comprises the step of loading the spacers D, stacked on one another, on the pallet 2 such that the through holes H of the spacers of each stack are aligned on one another and a vertical peg 4 of the pallet 2 is inserted inside the aligned through holes H of the spacers of the stack.

The method may comprise the step of moving (with reciprocal motion) the pallets 2, each loaded with the stacks of spacers D, from the loading station 5 to the withdrawal station 6 in which the stacks of spacers are unloaded from each pallet 2, after which the unloaded pallet 2 is lowered by the movable plane to a lower level, in particular to the first lower zone of the return path 9.

After this, the empty pallet 2 returns backwards by means of the pallet return device that transports the empty pallet along the return path 9 to the empty pallet 8 recovery zone. The movable plane can then ascend and return to the withdrawal station 6 to receive a new pallet 2 loaded with spacers.

The stack of spacers D is introduced into the respective hopper through the upper opening of the hopper. The spacers D are unloaded from the hopper 25, 26, 27 one at a time.

The step of transferring the stacks of spacers D from the withdrawal station 6 to a respective hopper 25, 26, 27 comprises the following subsidiary steps: removing a stack of spacers D from the withdrawal station 6, positioning the stack of spacers in the temporary storage zone 10 and transporting the stack of spacers D from the temporary storage zone 10 to a respective hopper 25, 26, 27.

The stacks of spacers D are withdrawn from the withdrawal station 6 and positioned in the temporary storage zone 10 by the first manipulator 15. The first manipulator 15 positions the stacks of spacers, one at a time, in the inlet 11 of the temporary storage zone 10.

The temporary storage zone 10 is configured to house a plurality of stacks of spacers D arranged in a row one after the other, for example ten stacks as in the illustrated embodiment. The stacks of spacers D can be moved from the inlet 11 to the outlet 12 of the temporary storage zone 10 with intermittent motion.

The temporary storage zone 10 comprises a horizontal resting and sliding plane, along which the stacks of spacers D can be moved slidably in a resting relationship.

Figure 15:
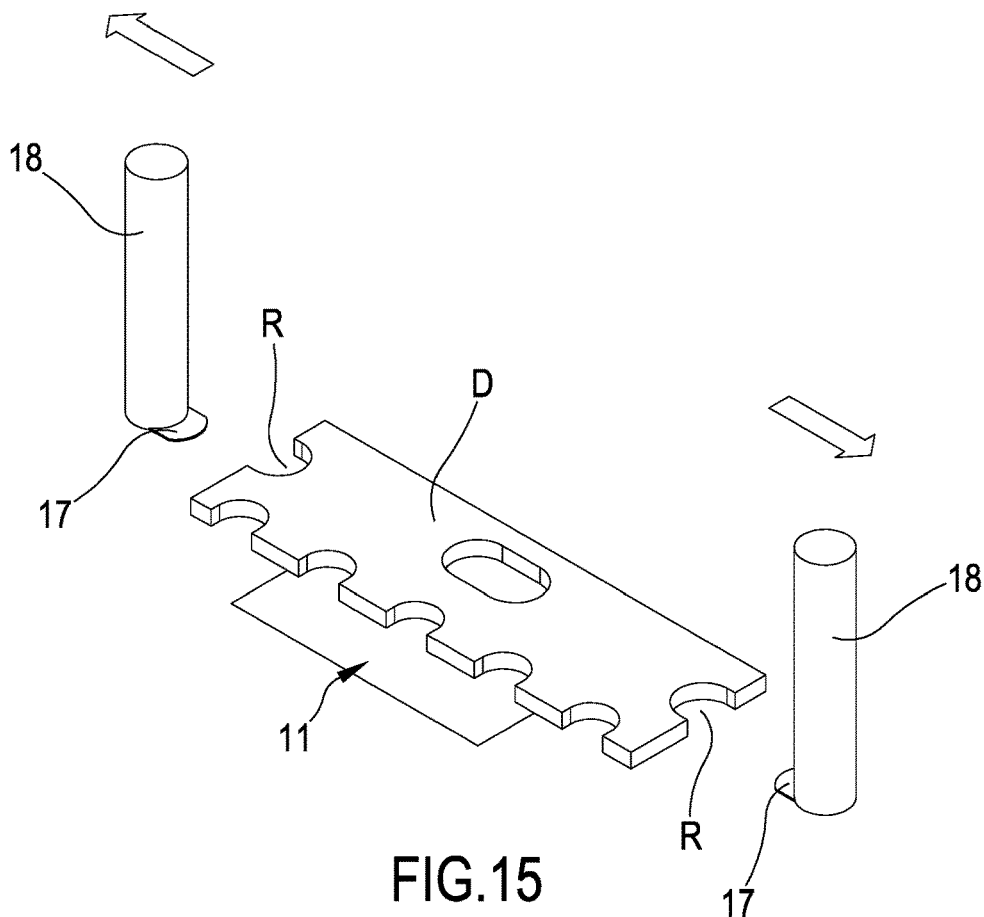
FIG. 15 is a partial and schematic perspective view of the first manipulator that deposits a single stack of spacers at the entrance of the temporary storage zone.

The resting and sliding plane, as in the embodiment shown in FIG. 15 (in which for the sake of simplicity only the last spacer D at the base of the stack is shown), may be narrower than the spacers D, to facilitate depositing of the stacks of spacers at the inlet 11 of the temporary storage zone 10 by the first manipulator 15 and the removal of the stacks of spacers from the outlet 12 of the temporary storage zone 10 by the second manipulator 21. In fact, as the width of the resting and sliding plane is less than the length of the spacers, only the central parts of the stacks of spacers rest on the resting and sliding plane, whereas the space below the two opposite ends of the stacks is empty to facilitate inserting of the supporting feet 17 and 23 of the manipulators.

The stacks of spacers D are transported from the outlet 12 of the temporary storage zone 10 to the desired hopper 25, 26 or 27 by the second manipulator 21. The second manipulator 21 removes the stacks of spacers, one at a time, from the outlet 12 of the temporary storage zone 10 and introduces the stacks of spacers from above into the selected hopper.

The temporary storage zone 10 permits continuity of feeding of the stacks of spacers D to the various hoppers 25, 26, 27 also in the pallet changing steps, in which the empty pallet 2 is removed from withdrawal station 6 (to be transported to the empty pallet 8 recovery zone) and a new pallet 2 loaded with spacers is fed from the intermediate station 7 to the withdrawal station 6.

The movable transport head 16, 22 of each manipulator, first manipulator 15 or second manipulator 21, when it has to handle a stack of spacers, is controlled so as to position the two vertical rods 18, 24 in an open position in which they are spaced out from one another, on the two opposite sides of the stack of spacers D, to then approach the two rods 18, 24 to one another to take the two rods 18, 24 to a closed position so that the two supporting feet 17, 23 are positioned below the two opposite sides of the stack of spacers.

In this closed position the two rods 18, 24 can be at least partially inserted in the recesses R obtained in the two opposite sides of the spacers D that form the stack. In this closed position the stack of spacers can rest on the two supporting feet 17, 23. At this point the transport head 16, 22 can be moved to transport the stack of spacers to the desired arrival point, maintaining the stack of spacers resting on the supporting feet 17, 23.

Figure 16:
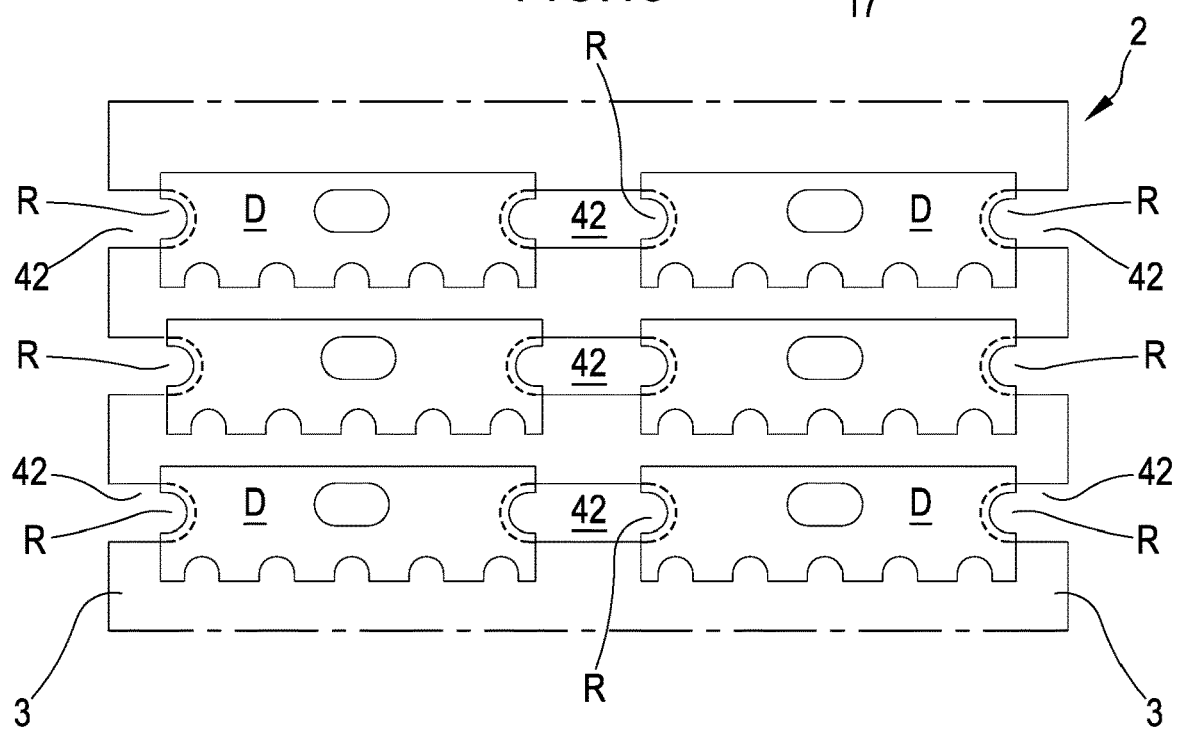
FIG. 16 is a top partial and schematic plan view of a second embodiment of a pallet for transporting the stacked spacers.

Each pallet 2 may comprise, as in the illustrated embodiment in FIG. 16, a plurality of openings 42 arranged on the base 3 of the pallet 2 at the opposite sides of the spacers D where the supporting feet 17 of the first manipulator 15 operate. In particular, the openings 42 are arranged at the recesses R obtained on the opposite sides of the spacers D.

The openings 42 obtained on the base 3 facilitate the insertion of the supporting feet 17 below the stack of spacers D in the step of removing and lifting the stack from the pallet 2. The supporting feet 17 can, in fact, enter the openings 42 and, then, be easily positioned below the stack of spacers D in the empty spaces created by the openings 42.

Figure 13:
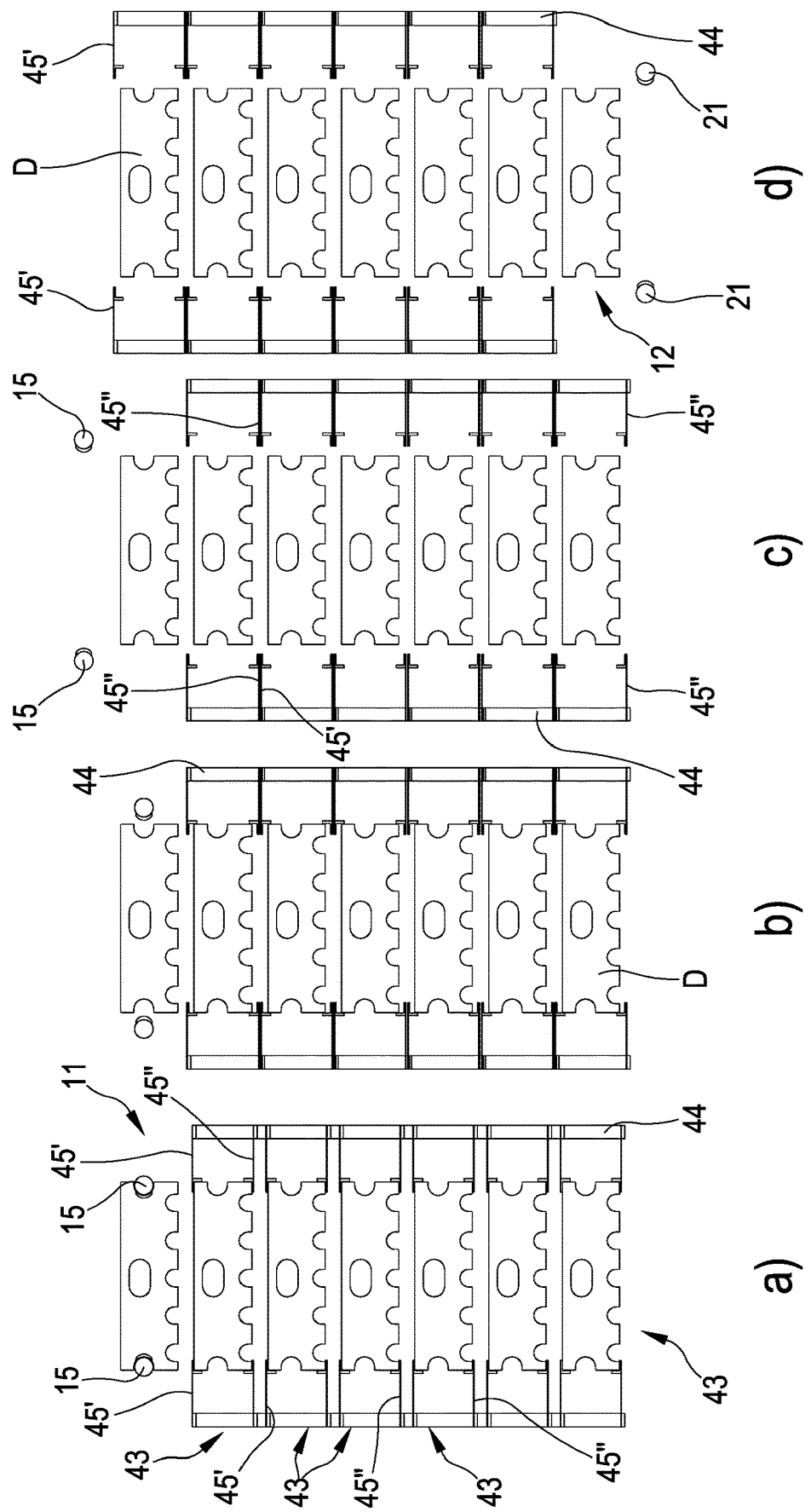
FIGS. 13 and 14 show some top plan views that represent as many sequential operating steps of a second embodiment of the conveyor for indexed advancement of the stacks of spacers in the temporary storage zone.
Figure 14:
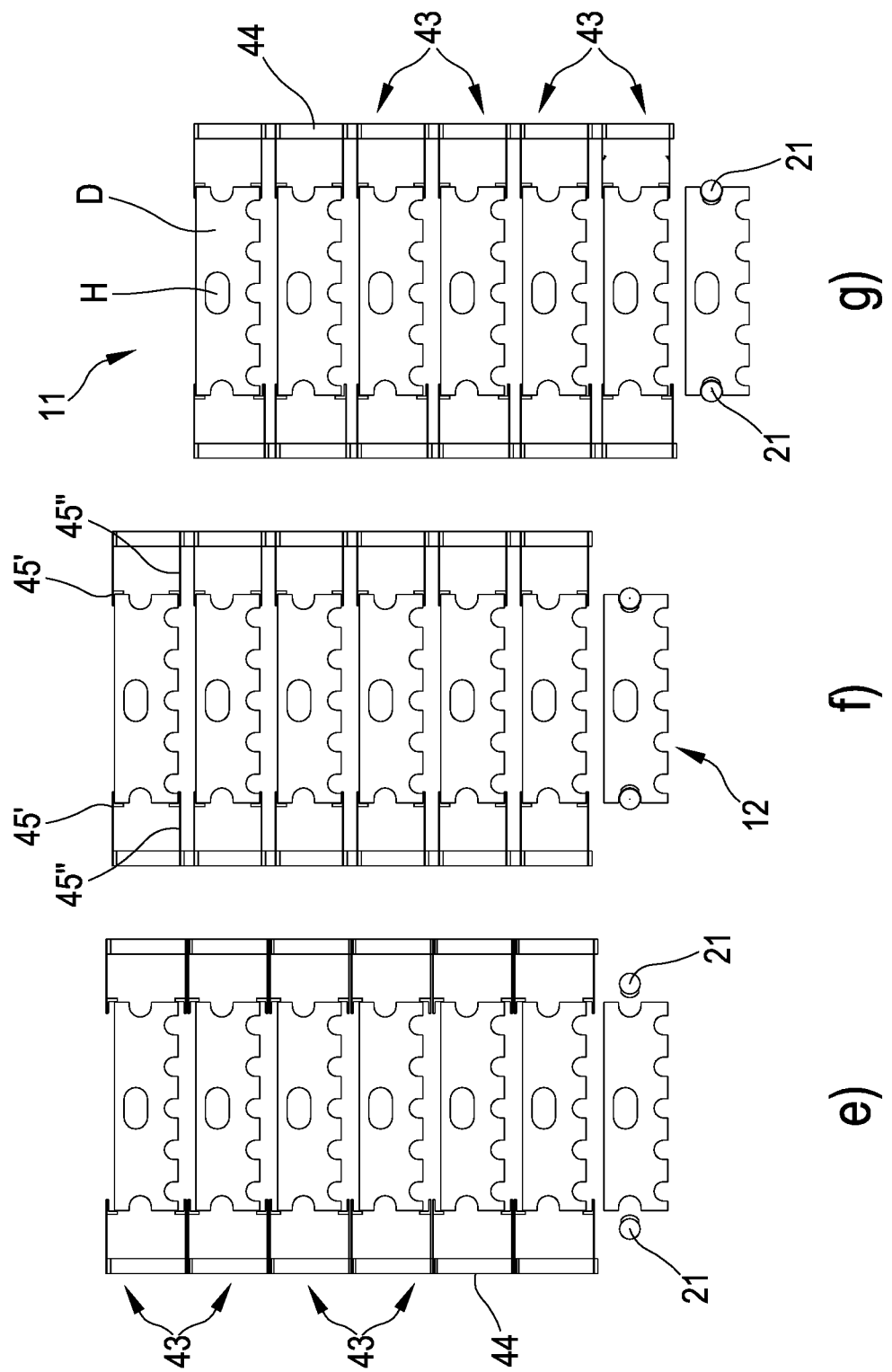

FIGS. 13 and 14 show a second embodiment of a conveyor configured to transport the stacks of spacers D from the inlet 11 to the outlet 12 of the temporary storage zone 10 with intermitted advancing motion.

The conveyor of FIGS. 13 and 14 comprises a number N of an indexed advancement unit 43 arranged in a row one after the other (FIGS. 13 and 14 show an embodiment in which N=6). Each indexed advancement unit 43 is configured to advance by a step a stack of spacers D from a general position "i" to the next position "i+1", where it is understood that the first position (i=1) corresponds to the inlet 11 of the temporary storage zone 10 and the last position (i=N+1) corresponds to the outlet 12 of the temporary storage zone 10.

Each indexed advancement unit 43 is configured to return backwards by a step, from the position "i+1" to the position "i", to permit the necessary positioning to then carry out the advancement of the next stack of spacers by a step.

Each indexed advancement unit 43 may comprise, as in the illustrated embodiment, a thrust device that is able to adopt a closed thrust position, in which the thrust device can advance (by a step), interacting in contact with a stack of spacers D to push the indexed advancement unit 43 forwards, and an open non-interference position, in which the thrust device can move back (by a step) without interacting in contact with the stack of spacers D.

The various indexed advancement units 43 advance by a step simultaneously. Similarly, the corresponding backward step can occur simultaneously for all the indexed advancement units 43. The various indexed advancement units 43 are supported by a shared support arrangement 44 that is able to perform, at the command of motor-driven driving means (not illustrated), the reciprocal backwards and forwards movement to make the stacks of spacers move backwards and forwards in an indexed manner.

In the specific example, the indexed advancement units 43 are made by a first row of arms 45', 45" and a second row of arms 45', 45" placed alongside parallel to the first row of arms. The two rows of arms are arranged one two opposite sides of the temporary storage zone 10. For each row, the arms in an odd-number position in the row have been indicated with 45' (starting from the inlet 11 to the outlet 12), the arms in an even-number position have been indicated with 45".

The arms 45', 45" are configured to engage the stacks of spacers D. Each arm 45', 45" may comprise, in particular, an angular (right-angled) element extending vertically that engages a vertical corner zone of the stack of spacers D (the stack being substantially parallelpipedon-shaped).

Each indexed advancement unit 43 comprises two arms 45' in an odd-numbered position (one for each row of arms) and two arms 45" in an even-numbered position (one for each row of the arms).

Figure 18:
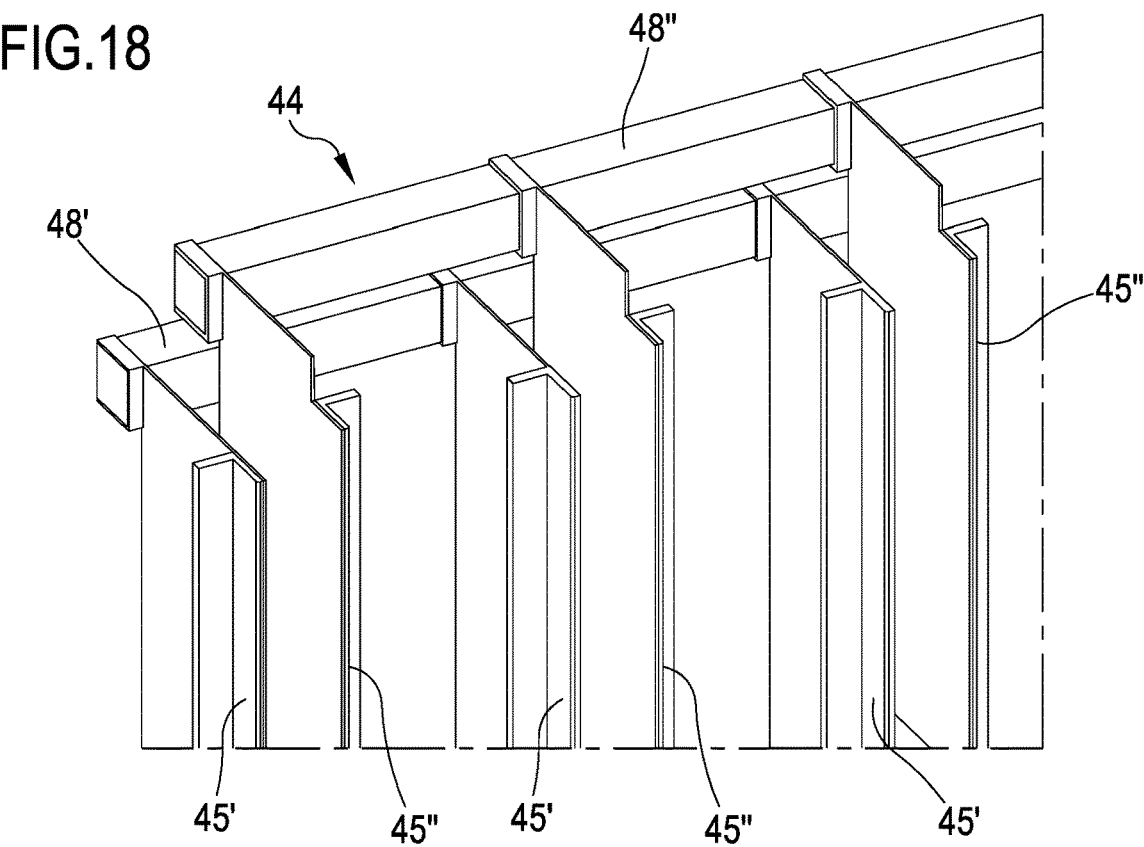
FIG. 18 is a perspective view of a part of the conveyor of FIGS. 13 and 14.

For each row of the arms, the arms 45' in an odd-numbered position move in concert. Similarly, for each row of arms, the arms 45" in an even-numbered position move in concert. In particular, the support arrangement 44 comprises one or more supports 48' configured to support together the arms 45' and one or more supports 48" configured to support together the arms 45". The supports 48', 48" may comprise one or more rods on which the arms 45', 45" are fixed, for example at least two rods (FIG. 18 shows a rod for the support 48' and a rod for the support 48"). Each rod of the supports 48' and 48" extends in length in a horizontal direction.

FIGS. 13 and 14 illustrate some steps in sequence of the operation of the conveyor with a reciprocal forward and backward movement.

In step a), the conveyor is in an advanced position, with the indexed advancement units 43 in a closed position engaging the stacks of spacers D. The first manipulator 15 can position a stack of spacers at the inlet 11 of the temporary storage zone 10.

In step b), the indexed advancement units 43 open the gripping arms 45', 45" to abandon the grip on the stacks of spacers D. In this disengagement step, the arms 45' in an odd-numbered position, carried by the support 48', move, together, with a backward movement, i.e. to the inlet 11, whilst, simultaneously, the arms 45" in an even-numbered position, carried by the support 48", move, together, with a forward movement, i.e. to the outlet 12. The first manipulator 15 can be opened to abandon the grip on the stack of spacers D that had just been positioned at the inlet 11.

In step c), the arms 45', 45" of one row are spaced away from the arms 45', 45" of the other row, so that the indexed advancement units 43 are taken to an open non-interference position, in which they are spaced away from the stacks of spacers D to permit the subsequent backward return step by one step.

In step d), the indexed advancement units 43 moved backwards by one step. The stack of spacers situated on the outlet 12 of the temporary storage zone 10 is free to be handled by the second manipulator 21.

In step e), the arms 45', 45" of one row are approached to the arms 45', 45" of the other row, so that the indexed advancement units 43 are returned to the closed position, to permit the subsequent step of engaging the stacks of spacers. The second manipulator 21 can be arranged near the last stack located on the outlet 12 to remove it.

In step f), the various indexed advancement units 43 close in such a manner that the gripping arms 45', 45" can engage the N stacks of spacers D situated in the temporary storage zone 10, starting from the stack situated at the inlet 11. In this engagement step, the arms 45' in an odd-numbered position move, together, with a forward movement to the outlet 12, whereas, simultaneously, the arms 45" in an even-numbered position move, together, with a backward movement to the inlet 11. The last stack of spacers situated on the outlet 12 can be grasped by the second manipulator 21.

In step g), the conveyor is returned to the advanced position, dragging forwards by a step all the stacks of spacers D, whereas the second manipulator 21 has already removed the stack of spacers that was located at the outlet 12 of the temporary storage zone 10.

At this point the first manipulator 15 can transfer a new stack of spacers D to the inlet 11 of the temporary storage zone 10 to restart a new cycle from step a).

It is possible to provide an embodiment, which is not illustrated, in which the transport line is duplicated that includes feeding the loaded pallets and the return of the empty pallets. The second transport line may be placed alongside parallel to the first transport line and may comprise a second withdrawal station (next to the withdrawal station 6), reachable by the first manipulator 15. In this case, the second withdrawal station can act as a buffer during the withdrawal station 6 pallet changing step and, vice versa, the withdrawal station 6 can act as a buffer during the pallet changing step of the second withdrawal station, so that the temporary storage zone 10 and/or the second manipulator 21 might not be present.

The second transport line may comprise a second loading station (alongside the loading station 5) and/or a second intermediate station (next to the intermediate station 7) and/or a second empty pallet recovery zone (next to the empty pallet 8 recovery zone) and/or a second return path of the empty pallets (alongside the return path 9).

The invention claimed is:

1. A method for feeding spacers for cigarette packs, the spacers being insertable in cartons for cigarette packs to space out packs with dimensions smaller than the standard dimensions, the method comprising the steps of:
    placing at least one pallet, loaded with one or more stacks of spacers, in a withdrawal station;
    transferring each stack of spacers from the withdrawal station to a respective hopper passing the stack of spacers through an upper opening of the hopper;
    unloading the spacers one by one from the hopper through a lower opening of the hopper;
    wherein said transferring step comprises the steps of positioning two supporting feet of a manipulator on two opposite sides of at least one stack of spacers and moving the supporting feet to transport the stack keeping it resting on the supporting feet, the two supporting feet being carried by two respective vertical rods which, when the supporting feet are positioned under the stack of spacers, are at least partly inserted into recesses formed on two opposite sides of the spacers that form the stack.

2. The method according to claim 1, wherein each spacer comprises one or more through holes and the pallet comprises one or more vertical elements; the through holes of the spacers of each stack being vertically aligned, so that each vertical element is inserted inside the aligned through holes of the spacers of the stack.

3. The method according to claim 1, wherein said transferring step comprises the steps of withdrawing each stack of spacers from the withdrawal station, positioning each stack of spacers in a temporary storage area and transporting each stack of spacers from the temporary storage area to a respective hopper.

4. The method according to claim 3, wherein each stack of spacers is withdrawn from the withdrawal station and positioned in the temporary storage area by at least one first manipulator and is then transported from the temporary storage area to a respective hopper by at least one second manipulator.

5. The method according to claim 4, wherein the first manipulator positions each stack of spacers in an inlet of the temporary storage area and the second manipulator withdraws each stack of spacers from an outlet of the temporary storage area, there being provided to convey, by at least one conveyor, a plurality of stacks of spacers, arranged in row one after the other, from the inlet to the outlet of the temporary storage area.

6. The method according to claim 1, wherein each pallet loaded of stacks of spacers is moved from a loading station to the withdrawal station where the stacks of spacers are unloaded, each unloaded pallet being then moved from the withdrawal station to an empty pallet recovery area.

* * * * *